(12) United States Patent
Schluessler et al.

(10) Patent No.: US 7,424,711 B2
(45) Date of Patent: Sep. 9, 2008

(54) ARCHITECTURE AND SYSTEM FOR HOST MANAGEMENT

(75) Inventors: Travis Schluessler, Hillsboro, OR (US); Priya Rajagopal, Wharton, NJ (US); Ray Steinberger, San Diego, CA (US); Tisson K. Mathew, Beaverton, OR (US); Arun Preetham, Irvine, CA (US); Ravi Sahita, Beaverton, OR (US); David Durham, Hillsboro, OR (US); Karanvir (Ken) Grewal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 469 days.

(21) Appl. No.: 11/170,491

(22) Filed: Jun. 29, 2005

(65) Prior Publication Data

US 2007/0005572 A1 Jan. 4, 2007

(51) Int. Cl.
- G06F 9/46 (2006.01)
- G06F 7/00 (2006.01)
- G06F 17/30 (2006.01)
- G06F 3/00 (2006.01)
- G06F 9/44 (2006.01)
- G06F 13/00 (2006.01)

(52) U.S. Cl. ............... 718/100; 707/1; 707/3; 719/313

(58) Field of Classification Search ........... 719/313; 718/100, 104; 707/1, 3
See application file for complete search history.

(56) References Cited

U.S. PATENT DOCUMENTS

| | | | |
|---|---|---|---|
| 6,151,610 A * | 11/2000 | Senn et al. | 715/516 |
| 6,865,551 B1 * | 3/2005 | Stefik et al. | 705/51 |
| 6,931,419 B1 * | 8/2005 | Lindquist | 707/200 |
| 7,076,655 B2 * | 7/2006 | Griffin et al. | 713/164 |
| 7,228,548 B1 * | 6/2007 | Aldrich et al. | 719/310 |
| 2003/0028521 A1 * | 2/2003 | Teloh et al. | 707/3 |
| 2004/0068723 A1 * | 4/2004 | Graupner et al. | 717/171 |
| 2004/0111505 A1 * | 6/2004 | Callahan et al. | 709/223 |
| 2005/0283481 A1 * | 12/2005 | Rosenbach et al. | 707/10 |
| 2006/0259897 A1 * | 11/2006 | Zorn et al. | 717/118 |
| 2007/0006120 A1 * | 1/2007 | Proebsting et al. | 717/101 |

* cited by examiner

*Primary Examiner*—Meng-Ai An
*Assistant Examiner*—Eric C. Wai
(74) *Attorney, Agent, or Firm*—Buckley, Maschoff & Talwalkar LLC

(57) ABSTRACT

According to some embodiments, a system provides a resource service module, a resource data record repository, and a provider module. The resource service module exposes an interface, receives an invocation of the interface from a system management module, and requests managed resource data associated with a manageable resource based on the invocation. The resource data record repository includes a resource data record indicating a memory location of a managed host in which the managed resource data is stored, and the provider module receives the request and retrieves the managed resource data from the memory location of the managed host.

26 Claims, 14 Drawing Sheets

ARCHITECTURE AND SYSTEM FOR HOST MANAGEMENT

BACKGROUND

A conventional computing platform may include diagnostic and management software tools. An operator may employ these tools to maintain, monitor and/or troubleshoot the computing platform. Such tools are typically executed within the operating system environment of the platform. Accordingly, the usefulness of these tools is limited if the operating system environment crashes, is compromised or tampered with by a computer worm/virus or malicious user, is disabled by a user, or is otherwise unavailable.

Next-generation platforms include an execution environment that is isolated from host operating system processes. Some proposed execution environments allow for isolated monitoring/management of hardware resources. Regardless, there is a need for a system that may provide more efficient and more comprehensive host management than what currently exists.

DETAILED DESCRIPTION

Figure 1:
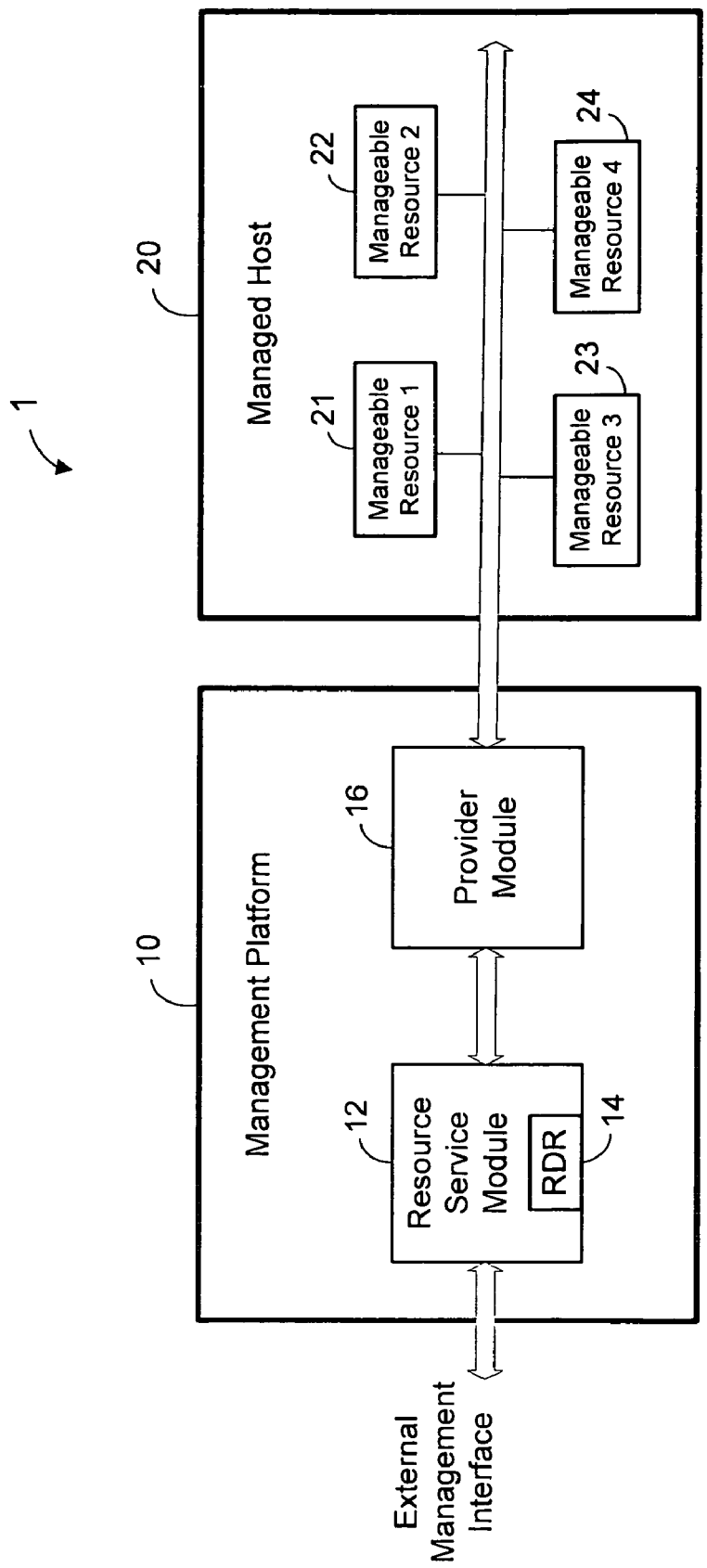
FIG. 1 is a block diagram of a system according to some embodiments.

FIG. 1 illustrates system 1 according to some embodiments. System 1 includes management platform 10 and managed host 20. Management platform 10 may interact with sensors and effectors exposed by managed host 20 in order to manage managed host 20.

In one example of operation, resource service module 12 of management platform 10 may receive a request from a system management module (not shown) via an external management interface. The request may request managed resource data associated with one of manageable resources 21 through 24 of managed host 20. Resource service module 12 then identifies one of resource data records (RDRs) 14 that corresponds to the request. More particularly, resource service module 12 identifies an RDR that is associated with the subject one of manageable resources 21 through 24 and that indicates a memory location of managed host 20 in which the requested managed resource data is stored.

Resource service module 12 instructs provider module 16 to retrieve the managed resource data from the indicated memory location. Provider module 16 therefore communicates with managed host 20 over bus 25 to retrieve the managed resource data. According to some embodiments, the managed resource data is passed from provider module 16 to resource service module 12 and to the requesting system management module via the external management interface.

Some embodiments of the foregoing may provide an extensible system for managing hardware and software resources of a host platform via a consistent interface.

Management platform 10 may comprise any one or more execution units including, but not limited to, a processor, a co-processor, a controller, one or more microengines of a network processor, a virtual machine, a logical partition, and a firmware extension. In some embodiments, management platform 10 may manage hardware and software resources of managed host 20 independent of an operating system environment provided by managed host 20.

In this regard, management platform 10 may provide an operating environment and memory separate from those of managed host 20. Accordingly, some embodiments of management platform 10 may manage host 20 before boot, after shutdown, or post-crash of the operating system environment of managed host 20. The separate environment may provide security advantages over a management service running local to host 20. Specifically, a management service running on host 20 can be more easily compromised by a virus or worm attack if other resources on host 20 are compromised.

Managed host 20 may comprise a processor, a motherboard, a main memory, a chipset, a network interface card, other expansion cards, a power supply, a cooling system, and/or any other hardware components. Managed host 20 may also execute program code of an operating system, device drivers, and applications. Any hardware and software components of managed host 20 may comprise manageable resources. Examples of these resources are abstracted in FIG. 1 as manageable resources 21 through 24, each of which may comprise a hardware or software resource. Managed host 20 may comprise any computing platform including one or more manageable resources.

A manageable resource may be associated with managed resource data comprising one or more sensors, effectors and events. For example, a fan speed and a processor temperature may comprise sensors associated with a fan resource and a processor resource, respectively. Network packet count statistics may constitute a sensor associated with a device driver for a network interface card. Values associated with each of these sensors may be stored in a memory location of managed host 20. As used herein, a memory location may describe a memory-mapped location (e.g. Read Only Memory (ROM), option ROM), Random Access Memory, removable storage, etc.) and an I/O port or bus over which management platform 10 must traverse to retrieve data. According to some embodiments, management platform 10 may manage a manageable resource by reading a sensor, configuring an effector, or subscribing to an event associated with the manageable resource.

Figure 2:
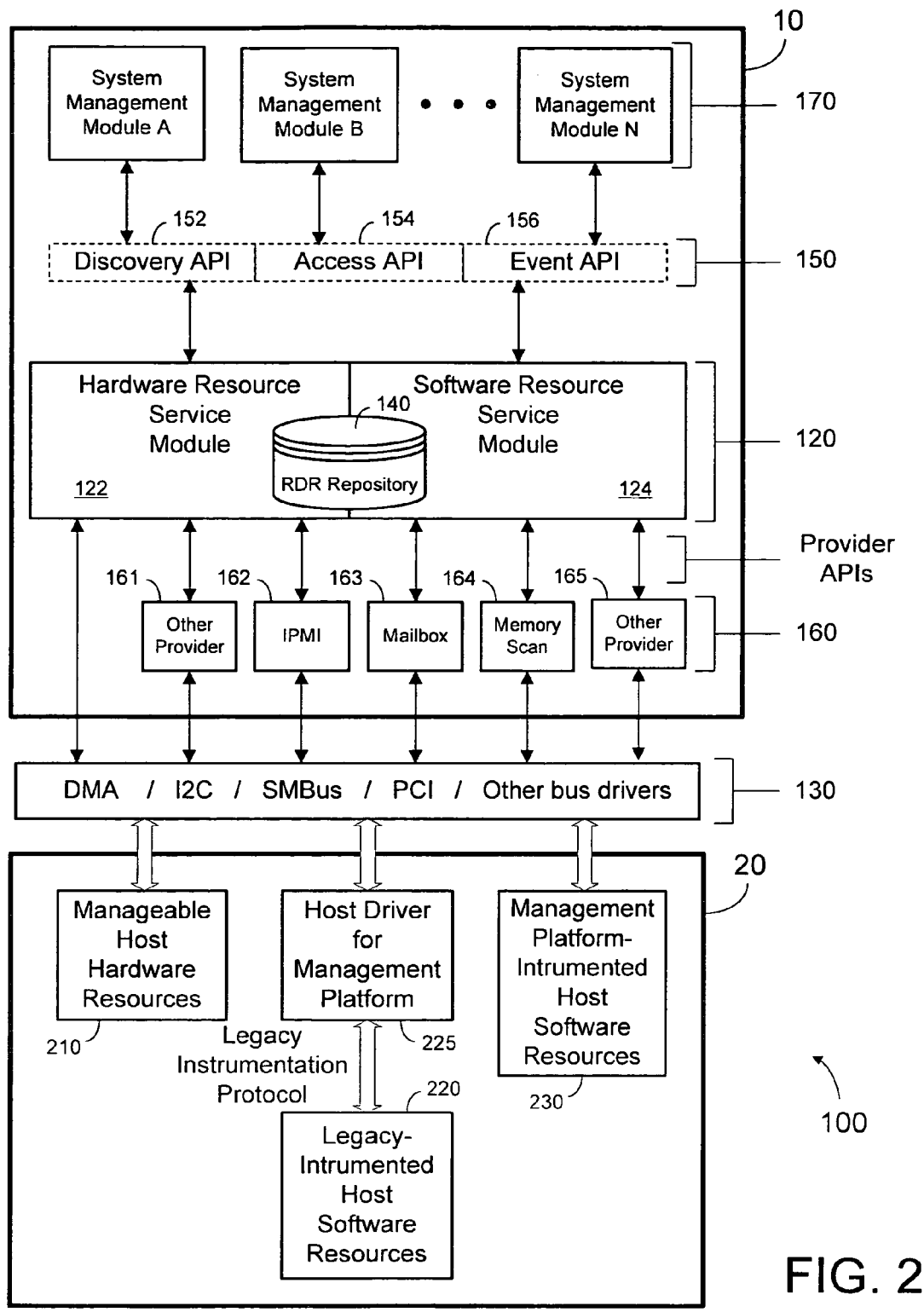
FIG. 2 is a detailed block diagram of a system according to some embodiments.

FIG. 2 comprises a detailed diagram of system 100 according to some embodiments. System 100 comprises a particular instantiation of management platform 10 and managed host 20 of FIG. 1. Accordingly, some embodiments of system 100 may provide the functions described above with respect to system 1. The elements of platform 10 and host 20 may be embodied as services, layers, and/or core components of an associated operating environment, and may be embodied as any other executable software component, including a dynamic link library or a stand-alone application.

Management platform 10 of FIG. 2 includes core 120 comprising hardware resource service module 122, software resource service module 124 and RDR repository 140. Core 120 exposes external interface 150, which includes Discovery application programming interface (API) 152, Access API 154, and Event API 156. System management modules 170 executing on management platform 110 invoke interface 150 to read sensors, configure effectors, and subscribe to events associated with manageable resources of managed host 120.

In particular, system management modules 170 may use Discovery API 152 to dynamically discover what manageable resources are present in managed host 20. Such discovery allows modules 170 to then invoke Access API 154 to query for managed resource data associated with resources with which they wish to interact. Event API 156 constitutes a set of APIs that would be used to subscribe to host-generated events and to publish events.

Interface 150 may therefore provide an efficient mechanism for instrumenting managed host 20 that provides a common namespace and common access methods. Interface 150 may also provides a layer of protection that prevents system management modules 170 from randomly accessing physical components or memory of host 20 that could cause system instability. In this regard, interface 150 may protect system integrity by restricting possible actions to a confined set of operations that logically apply to a particular sensor or effector.

Resource service modules 122 and 124 handle sensor read/effector write/event subscription requests that are received via external interface 150. Hardware resource service module 122 interacts with managed resource data associated with manageable hardware resources 210 on managed host 20 in response to invocations of interface 150. Hardware resource service module 122 may comply with existing protocols (e.g., Hardware Platform Interface, Intelligent Platform Management Interface) to interact with these resources either directly via an appropriate one of bus drivers 130 or via one of providers 160.

Software resource service module 124 interacts with managed resource data associated with manageable software resources of host 20. Examples include network statistics associated with a network interface card maintained by a network device driver, hard disk statistics associated with a hard disk maintained by a hard disk driver, etc. Manageable software resources may comprise legacy-instrumented host software resources 220 with which platform 10 interacts using corresponding platform software driver 225, and/or host software resources 230 that are instrumented in view of management platform 10 and may therefore directly interact therewith.

As shown in FIG. 2, modules 122 and 124 of core 120 interact with manageable resources of host 20 via providers 160. More particularly, modules 122 and 124 may use providers 160 to access transport mechanisms of host 20 in order to reach managed resource data stored therein. Each of providers 160 abstracts low-level communication with one or more corresponding bus drivers 130 to a single provider API. For example, mailbox provider 163 may expose a mailbox provider API to core 120 for communication between core 120 and two or more bus protocols. The number and type of providers in a given implementation of platform 10 may vary among embodiments.

Figure 3:
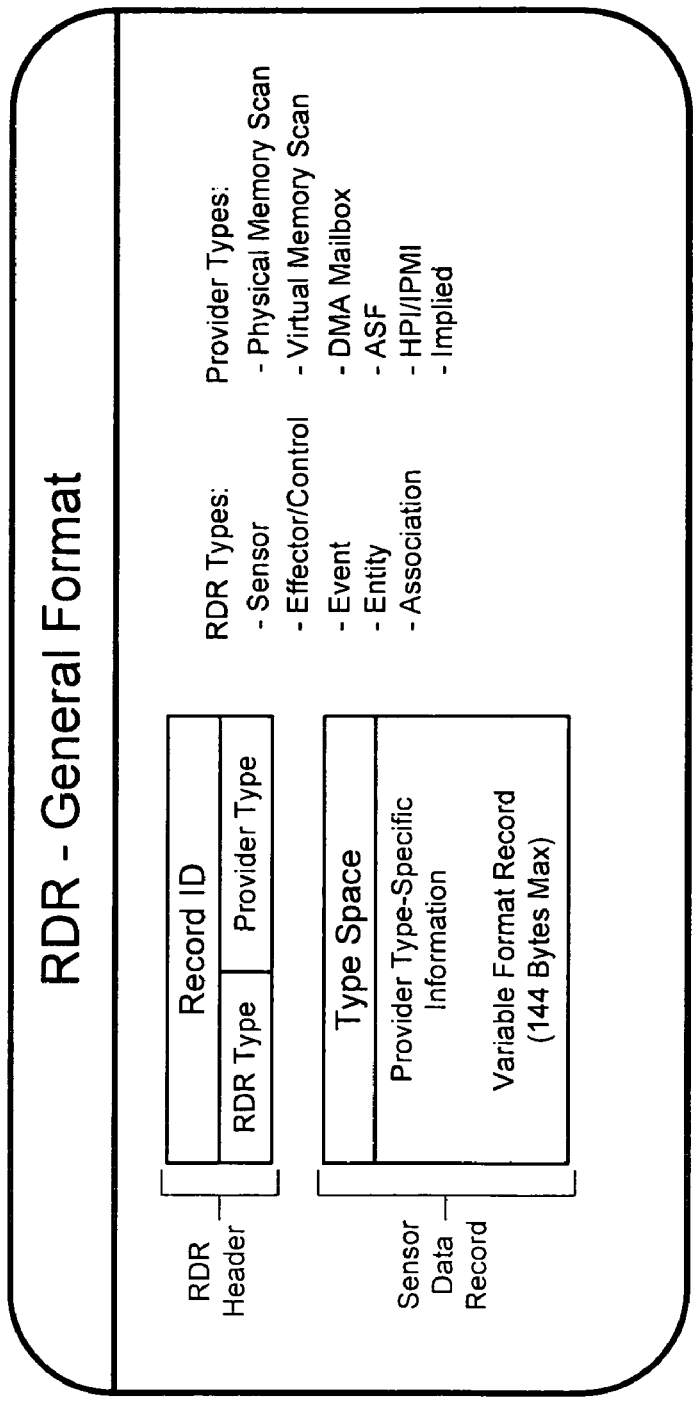
FIG. 3 illustrates a Resource Data Record format according to some embodiments.

Resource service modules 122 and 124 are also responsible for discovering manageable resources on host 20. The discovered resources (specified in the form of RDRs) are stored in RDR repository 140. FIG. 3 is a representation of an RDR of RDR repository 140 according to some embodiments. RDRs may be used to provide a consistent mechanism for describing manageable resources, their relationships, and the operations which can be performed on them.

As shown, an RDR may describe managed resource data of host 20, including data type (RDR type), type of provider 160 used to access the data, and other context information used by a provider 160 to access a sensor, effector or event associated with the RDR. Generally, a sensor RDR describes a resource capable of reading operational or health data (e.g. fan speed or Network Interface Card (NIC) statistics), an effector RDR describes a resource capable of platform control (e.g. powering on a fan or enabling a NIC's auto-negotiation feature), and an event RDR describes resource's capability to generate asynchronous events. Sensor, effector and event RDRs logically belong to one "parent" entity RDR that identifies an associated manageable resource.

An association RDR describes a logical relationship between two RDRs of any type. The meaning of the relationship is determined by the type information included with the association RDR. As will be described in detail below, management platform 10 may discover RDRs associated with managed host 20 and then use the RDRs to manage resources of host 20.

An RDR also specifies the provider which is used to access the managed resource data associated with the RDR. For example an "HPI/IPMI" RDR could describe a legacy resource represented by an IPMI-based data record and accessed via an I2C bus. A "DMA mailbox" RDR could describe a software resource owned by a host device driver which would be accessed via a DMA mailbox provider.

Figure 4:
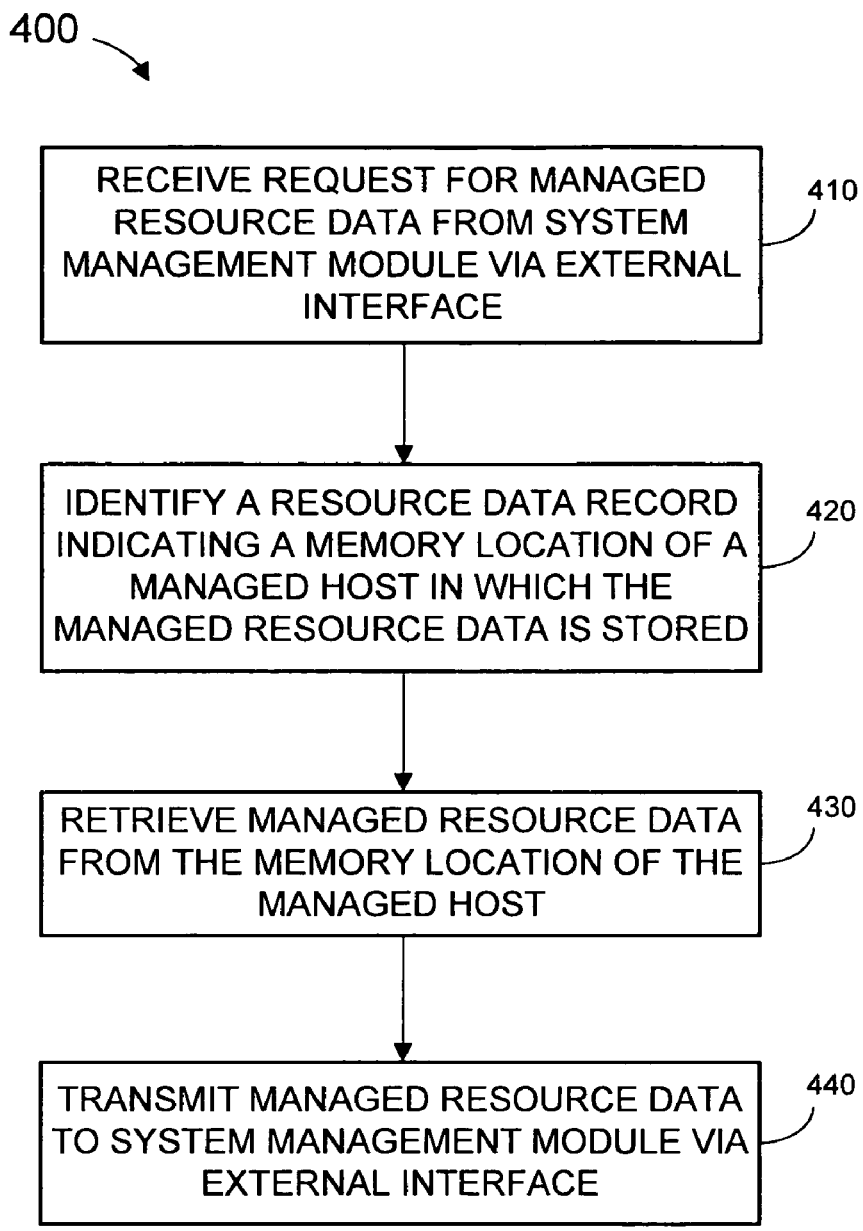
FIG. 4 is a flow diagram according to some embodiments.

FIG. 4 is a flow diagram of method 400 according to some embodiments. Method 400 may be executed by, for example, a system such as system 100 of FIG. 2. Note that any of the methods described herein may be performed by hardware, software (including microcode), or a combination of hardware and software. For example, an execution unit may be operative in conjunction with program code stored on a storage medium to perform methods according to any of the embodiments described herein.

Initially, at 410, a request for managed resource data is received. The request may be received from a system management module via an external interface. As an example of 410, software resource service module 124 may receive a request from system management module A via Access API 154. The request may request access to managed resource data associated with one of manageable resources 230 of managed host 20.

Next, an RDR is identified at 420. The RDR indicates a memory location of a managed host in which the requested managed resource data is stored. Continuing with the above example, software resource services module 124 identifies an RDR of RDR repository 140 at 420. The identified RDR includes a record ID that corresponds to the managed resource data. The RDR also specifies a type of provider needed to access the data, and a memory location at which the data resides.

The managed resource data is retrieved from the indicated memory location at 430. In some embodiments, one of providers 160 communicates with managed host 20 over bus drivers 130 to retrieve the managed resource data. The provider may correspond to the provider type indicated in the identified RDR. The particular method used to retrieve the data may at 430 depend upon the type of provider used. Examples of data retrieval using a mailbox-type provider and a memory scan-type provider will be described below.

Next, at 440, the retrieved managed resource data is transmitted to the requesting system management module via the external management interface. More particularly, the provider may pass the resource data to software resource service module 124 via a corresponding provider API, and module 124 may in turn pass the information in a callback to the interface of Access API 154 that was invoked prior to 410.

Figure 5:
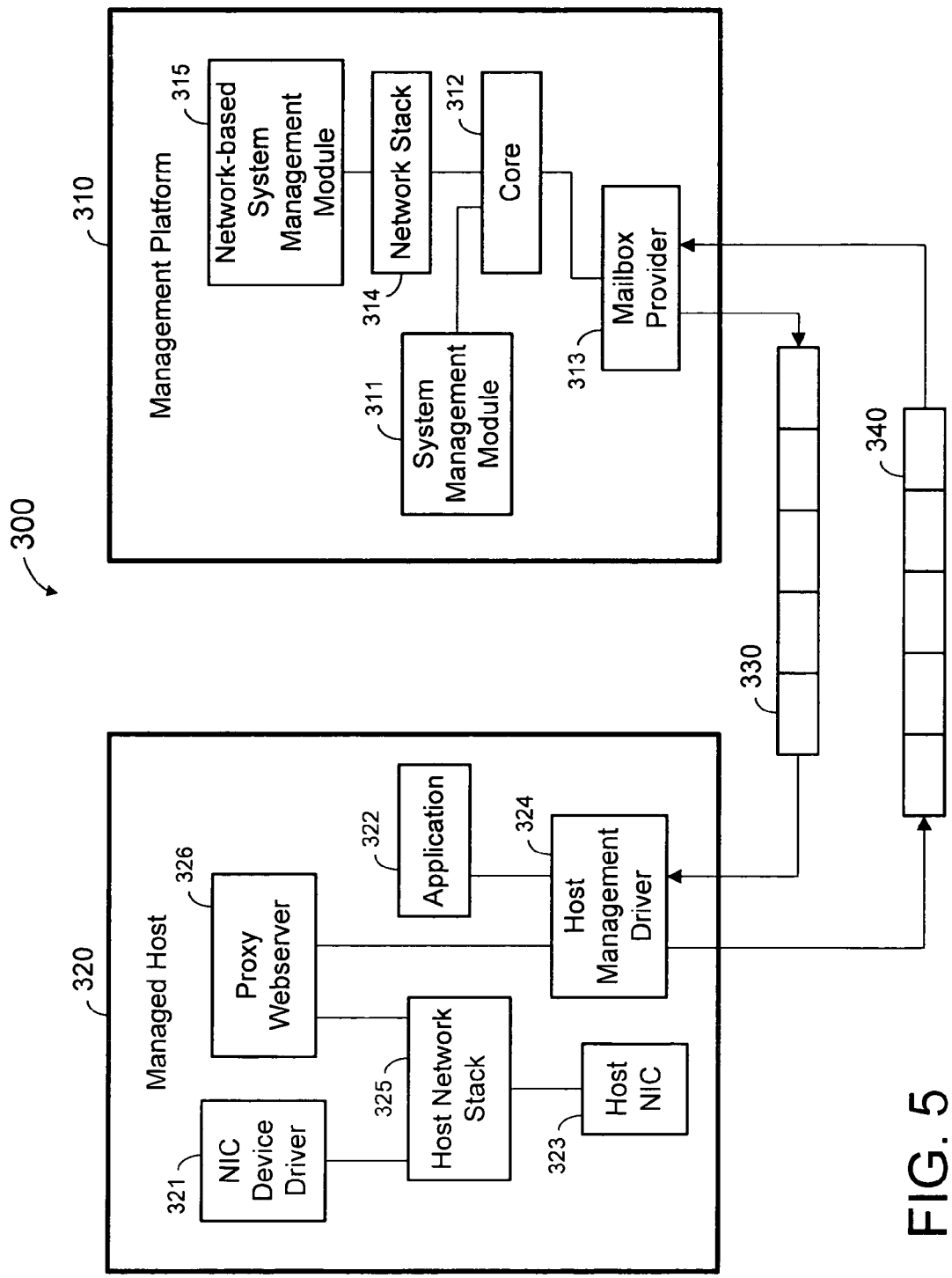
FIG. 5 is a block diagram illustrating a system to communicate via a mailbox protocol according to some embodiments.

FIG. 5 is a block diagram of system 300 to illustrate communication via a mailbox protocol according to some embodiments. System 300 comprises a particular instantiation of management platform 10 and managed host 20 of FIG. 1. Accordingly, some embodiments of system 300 may provide the functions described above with respect to system 1.

System 300 includes management platform 310 and managed host 320. Managed host 320 executes manageable software resources including NIC device driver 321 and application 322. Each of these manageable software resources is capable of providing instrumentation data to a managing entity (e.g., management platform 310). Managed host 320 may also include other manageable software resources, such as other device drivers, non-device driver kernel-mode modules, and application layer software.

Manageable software resources 321 and 322 are represented in FIG. 2 by legacy-instrumented host software resources 220. In this regard, resources 321 and 322 may be configured to provide instrumentation data via a legacy instrumentation protocol such as the Windows Management Instrumentation (WMI) protocol. Host management driver 324 may communicate with resources 321 and 322 via the legacy protocol while also supporting a mailbox protocol to provide instrumentation data to platform 310 as described below.

Briefly, system management module 311 may utilize core 312 and mailbox provider 313 to retrieve managed resource data of managed host 320 as described with respect to method 400. Mailbox provider 313 transmits a message to host 320 using first-in, first-out buffer (FIFO) 330. Host management driver 324 receives the message and controls application 322 in conjunction with the above-mentioned legacy protocol so as to receive the subject managed resource data. Host management driver 324 then passes the managed resource data back to mailbox provider 313 via FIFO 340.

FIFO 330 and FIFO 340 therefore queue messages from platform 310 to host 320 and from host 320 to platform 310, respectively. FIFO 330 and FIFO 340 may be implemented in various manners according to some embodiments. One or both of FIFO 330 and FIFO 340 may be located in memory of managed host 320, management platform 310, specially allocated bus memory (e.g., PCI), and/or any other suitable memory locations. Any number of FIFOs may be employed according to some embodiments. For example, each software resource of managed host 320 may be associated with a dedicated message receiving FIFO and a dedicated message transmitting FIFO.

The mailbox protocol may also be employed to access managed resource data associated with manageable resources over a network interface. For example, proxy Webserver 326 may be configured to listen on a particular TCP/IP port. Messages may therefore be sent from a managed resource such as the NIC device driver 321 to host management driver 324 by directing such messages to the particular port. The messages may be placed in FIFO 340 in packet form, received by mailbox provider 313, and passed from core 312 to network stack 313. Network stack 313 strips off a network header and presents the remaining data to network-based system management module 315. Messages may be sent from network-based system management module 315 to NIC device driver 321 by reversing the foregoing process. Additional secure protocols such as Transport Layer Security may be incorporated into either process.

Figure 6:
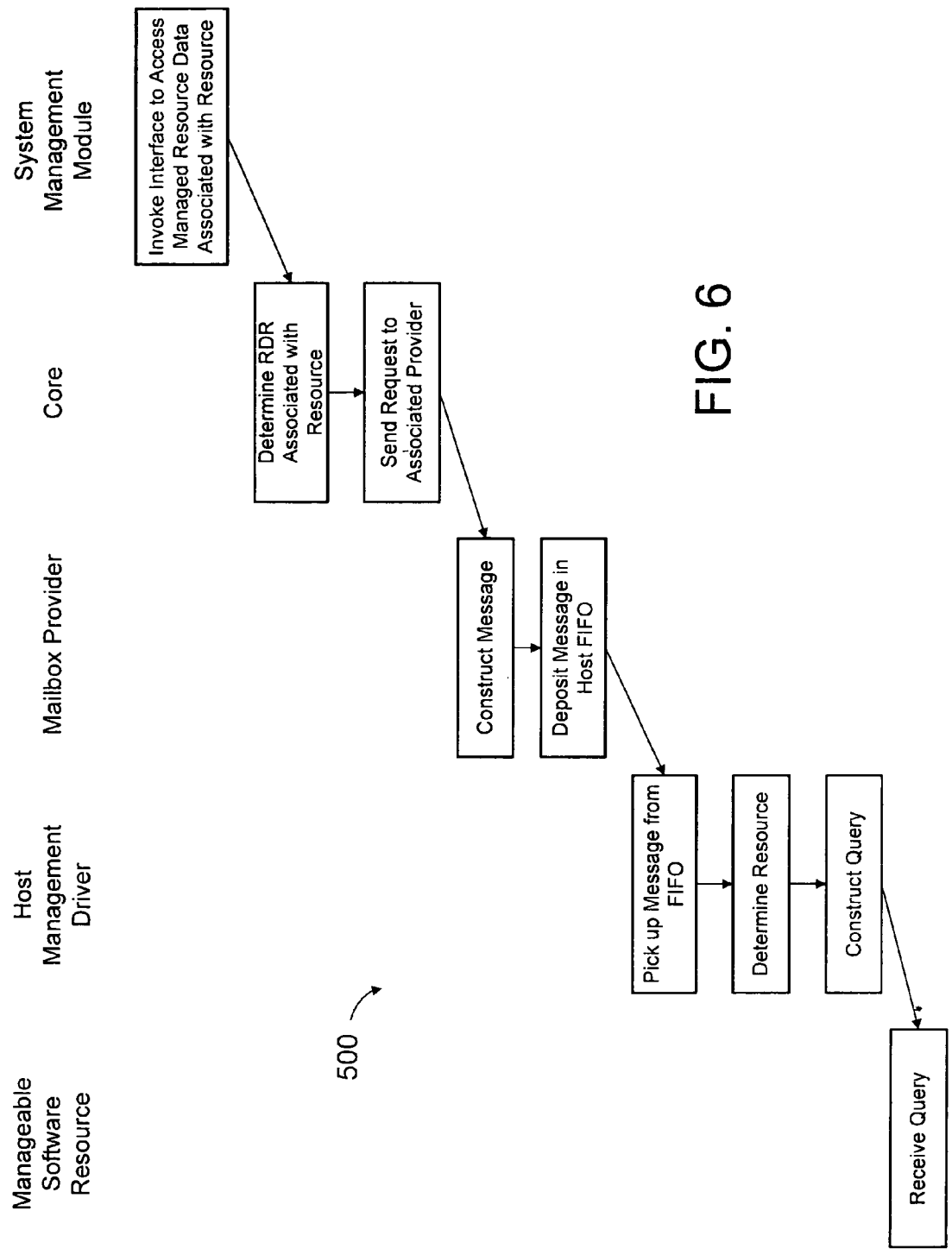
FIG. 6 is a flow diagram illustrating a request for management information via a mailbox protocol according to some embodiments.

FIG. 6 is a diagram of process 500 to transmit a message from a management platform to a managed host via a mailbox protocol according to some embodiments. Although process 500 may be executed by any suitable system, it will be described with respect to system 300 of FIG. 4 by way of example.

Initially, system management module 311 invokes an interface to access managed resource data associated with a manageable software resource of managed host 320. Core 312 receives the message and determines an RDR that is associated with the resource based on header information of the RDRs stored in or accessible to core 312. As mentioned above, each RDR is also associated with a provider type. Accordingly, core 312 identifies a provider of the associated type and sends a request for the managed resource data to the provider.

According to the present example, the associated provider is mailbox provider 313. Mailbox provider 313 constructs a message based on the request and deposits the message in FIFO 330. Host management driver 324 picks up the message from FIFO 330 in response to an interrupt triggered by storage of the message, in response to a periodic poll of FIFO 330, or by another mechanism.

Host management driver 324 determines the resource associated with the message (e.g., using an embedded resource ID or the like) and constructs a query that is suitable to return the requested managed resource data from the resource. The query may be based on and an operating system-specific management instrumentation interface supported by the resource. The query then delivered to the resource according to the operating system-specific management instrumentation interface.

Figure 7:
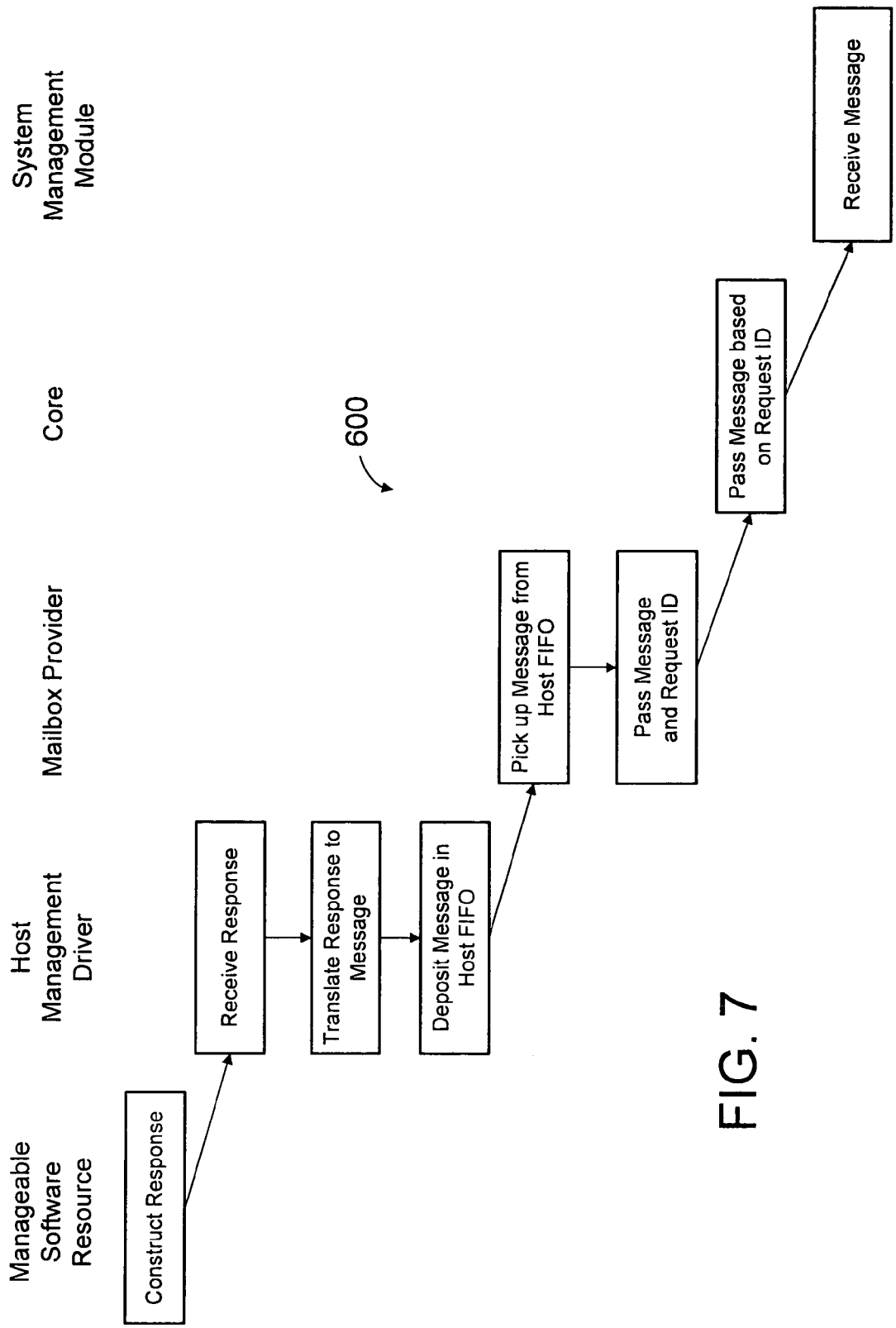
FIG. 7 is a flow diagram illustrating a response to the FIG. 6 request via a mailbox protocol according to some embodiments.

FIG. 7 is a diagram of method 600 to transmit requested managed resource data to a management platform from a managed host via a mailbox protocol according to some embodiments. Method 600 will be described with respect to system 300 of FIG. 4.

At the outset of method 600, manageable software resource 322 constructs a response to the previously-received query. The response may comply with an operating system-specific instrumentation interface and may be passed to host management driver 324 using such an interface. Host management driver 324 receives the response and translates the response to a message that can be interpreted by core 312 of management platform 310.

The translated message is deposited in FIFO 340. Mailbox provider 313 may pick up the message from FIFO 340 in response to an interrupt triggered by the deposit of the message or by other means. Mailbox provider 313 associates the message with a Request ID identifying the request that resulted in the message, and passes the ID and the message to core 312 using a suitable provider API. Core 312 then passes the message, which includes the requested managed resource data, to the system management module associated with the Request ID. Embodiments of the foregoing may be used to manage software resources that are not natively instrumented for management platform 310. Moreover, some embodiments may leverage operating system-specific management instrumentation protocols supported by the resources.

Methods 500 and 600 rely on RDRs for identification and access of manageable resources. In order to provide these RDRs to management platform 310, method 500 may be preceded by an initialization phase in which the manageable software resources of managed host 320 register their associated management instrumentation data (i.e., managed resource data) using existing operating system-specific management instrumentation protocols. Host management driver 324 then queries the protocol framework to identify the available management instrumentation data. In the case of the WMI protocol, such a query may comprise a query for all registered Globally Unique IDs. Host management driver 324 may construct an in-memory RDR repository based on the results of the query and on a pre-configured mapping between the operating-specific management instrumentation data type and the RDR type spaces.

After the initialization phase is complete, host management driver 324 may transmit a registration message to core 312 via the above-described mailbox protocol to indicate that initialization is complete. In response to the message, core 312 queries management driver 324 for its in-memory RDR repository. Host management driver 324 then returns the RDRs to core 312 via the mailbox protocol.

Initialization of system 300 may also comprise provisioning core 312 and host management driver 324 with symmetric keys using suitable and well-known out-of-band provisioning channels. Core 312 and host management driver 324 may also negotiate algorithms to be used for integrity computation during initialization. Accordingly, both core 312 and host management driver 324 may use the keys and algorithms to process each outgoing message for authentication and integrity checking, and to authenticate and check the integrity of each incoming message.

Figure 8:
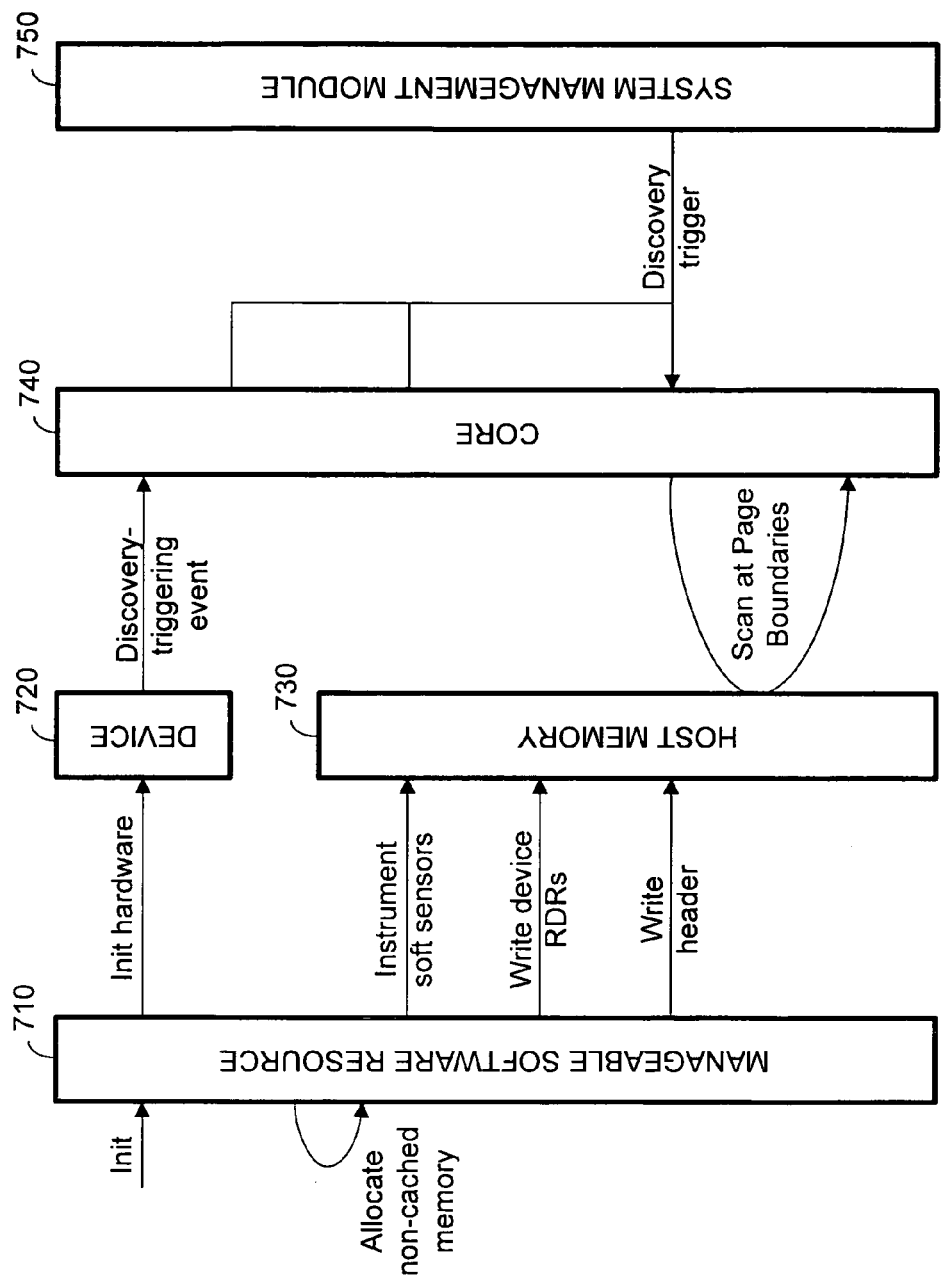
FIG. 8 is a block diagram illustrating a system to discover manageable resources according to some embodiments.

FIG. 8 is a diagram illustrating discovery of manageable resources according to some embodiments. System 700 of FIG. 8 includes manageable software resource 710, associated hardware device 720, host memory 730, core 740 and system management module 750. The elements of system 700 may instantiate any similarly-named elements described herein.

The above-described method for RDR discovery utilizes operating system-specific management instrumentation protocols implemented by a software resource as well as a host management driver to map operating-specific management instrumentation data type to RDR type spaces. Some embodiments may provide discovery of manageable resources without such prerequisites.

At initialization, resource 710 (i.e., a manageable software resource that wishes to advertise associated managed resource data) allocates contiguous, page-aligned, and non-cached memory. The allocated memory may be located in option Read Only Memory associated with device 720 or in any other memory elements. Resource 710 stores in the allocated memory a uniquely identifiable marker and pointers to other memory locations. Resource 710 also stores RDRs in the other memory locations that describe the managed resource data maintained by manageable software resource 710.

The initialization may cause device 720 (e.g., a NIC in a case that resource 710 comprises a NIC device driver) to issue an event to core 740 to trigger discovery of manageable resources. Core 740 uses memory scan provider (not shown) to search host memory 730 for the uniquely identifiable marker. Upon finding this marker, core 740 can identify all the RDRs describing manageable resource data associated with resource 710. In some embodiments, core 740 may initiate RDR discovery in response to a command received from system management module 750 via an external interface.

Figure 9:
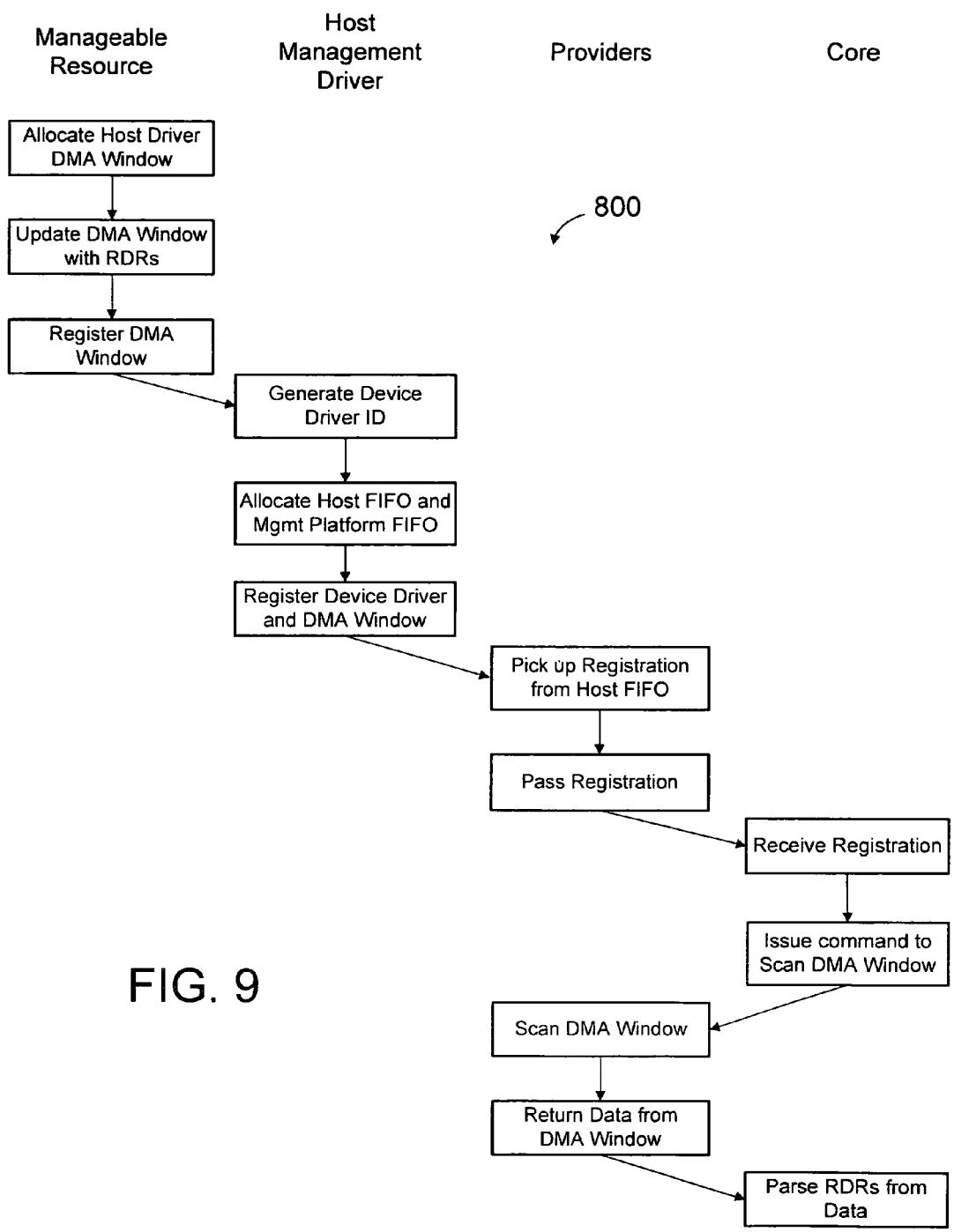
FIG. 9 is a flow diagram illustrating discovery of manageable resources according to some embodiments.

FIG. 9 comprises a flow diagram of method 800 for discovery of manageable resources according to some embodiments. Some implementations of system 700 may execute method 800 of FIG. 9.

Initially, a manageable software resource allocates a host driver Direct Memory Access (DMA) window in host memory. As described with respect to system 700, the window may comprise a contiguous, page-aligned and non-cached memory location. Next, the manageable software resource updates the DMA window with resource-related information. The information may include a marker identifying the window and RDRs associated with the manageable software resource.

Figure 10:
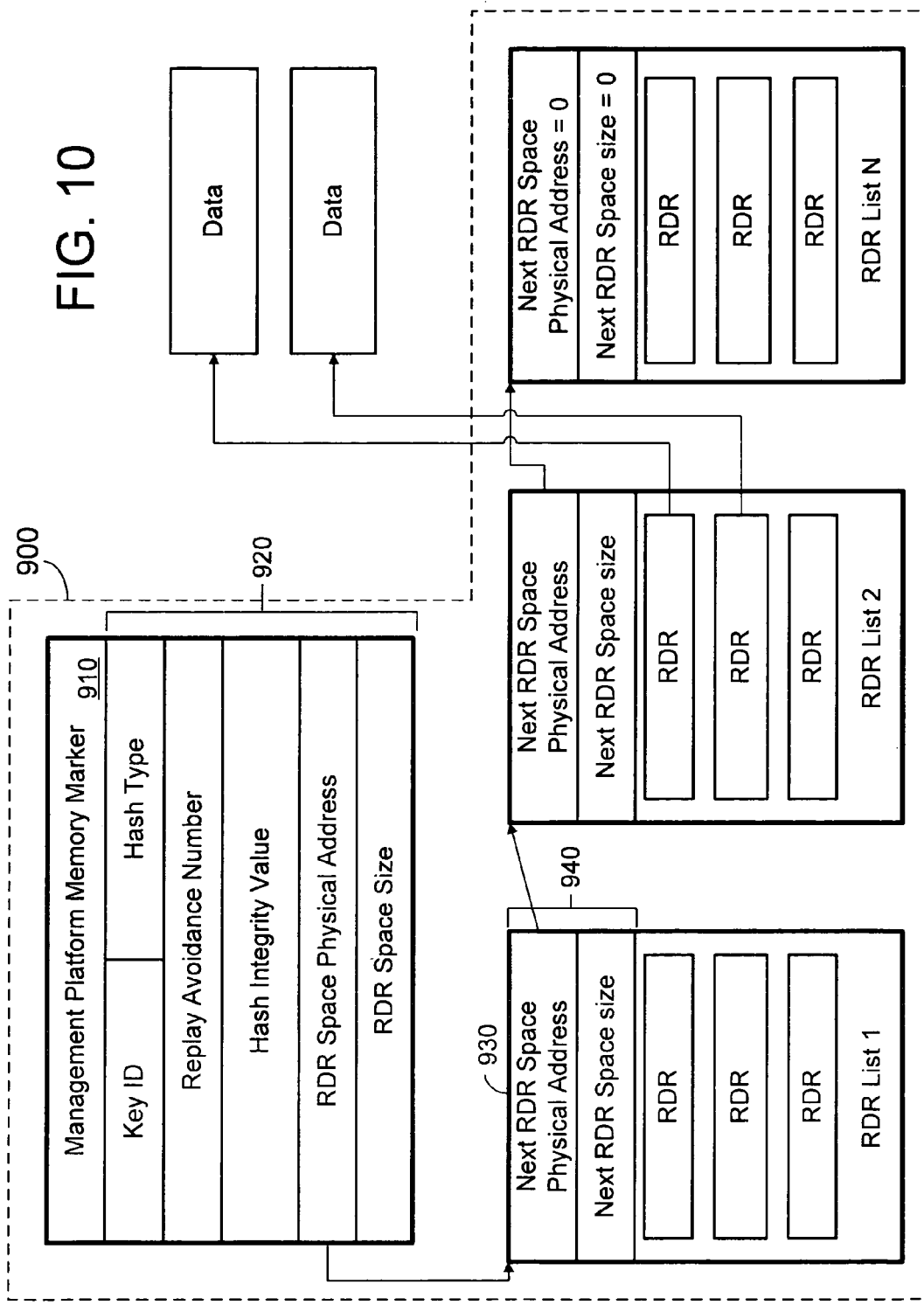
FIG. 10 is a block diagram illustrating memory structures of a host driver DMA window according to some embodiments.

FIG. 10 is a block diagram illustrating data that may be stored in host driver DMA window 900 and relationships between the data according to some embodiments. As will be described, the window stores information that enables a management platform to discover manageable resources and their associated RDRs.

Window 900 includes management platform memory marker 910 that is used to uniquely identify the start of a host driver DMA Window to a management platform. The marker may comprise a platform-specific 128-bit programmable value. The management platform requires this value for discovery according to method 800, and may obtain the value during initialization.

Also included is header data structure 920 with fields specifying a key Id, a hash type, a replay avoidance number, a hash integrity value, an RDR space physical address, and an RDR space size. The key Id may identify a key used to generate the hash value below, while the hash type may identify a hash algorithm used to generate the hash value. The replay avoidance number may be a monotonic increasing counter (i.e. during the lifetime of a system boot) used for generating the hash value. The integrity check value is a hash based on the algorithm identified by the hash type field, and covers memory marker 910, all the fields in header data structure 920, and the RDRs in RDR space 930.

In this regard, the RDR space physical address represents the physical address of first RDR space 930, and the RDR space size specifies the size of space 930. Space 930 itself consists of RDR list header 940 consisting of a Next RDR Space field and a Next RDR Space Size field. The Next RDR Space field specifies a physical address of a next RDR space in the chain, and the Next RDR Space Size field indicates a size of the next RDR space. As shown, the Next RDR Space Size field is equal to 0 if no other RDR space follows.

RDR space 930 also includes RDR list 930. RDR list 930 includes RDRs that describe sensors, effectors and events for the manageable resource associated with DMA window 900. Each RDR points to host memory locations for storing data related thereto, although only two such locations are illustrated in FIG. 10.

Returning to method 800, the manageable resource registers the DMA window with a host management driver located on the managed host, which in turn generates a device driver Id corresponding to the resource. The host management driver then allocates a host-to-management platform FIFO and a management platform-to-host FIFO (e.g., FIFOs 330 and 340) for bidirectional communication between the managed host and the management platform.

The host management driver registers the manageable resource and the associated DMA window with the management platform by passing the device Id and the address of the DMA window via the host-to-management platform FIFO. The management platform's mailbox provider receives this information from the FIFO and passes it on to the core. The core then issues a command to scan the DMA window at the DMA window address.

A memory scan provider of the management platform scans the DMA window to retrieve data therefrom. The data may comprise data such as that shown in DMA window 900. The data is returned to the core, and is parsed thereby to retrieve the RDRs stored therein. The core may first authenticate the data and check the data for integrity using the above-described hash integrity value. The core may then store the RDRs in an RDR repository in association with the previously-received device Id.

Figure 11:
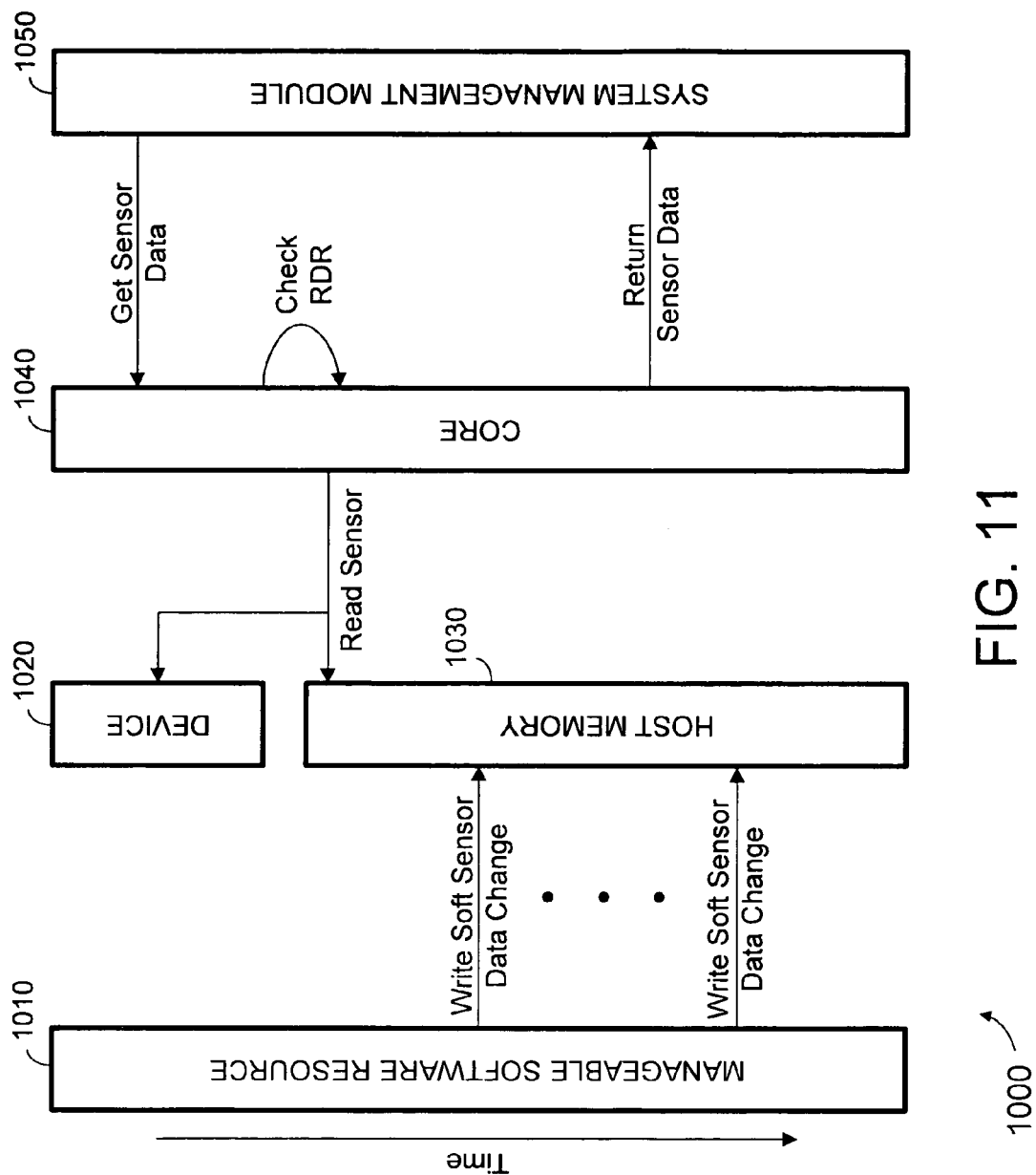
FIG. 11 is a block diagram illustrating a system to request and receive management information via a memory scan protocol according to some embodiments.

FIG. 11 is a diagram illustrating storage and retrieval of managed resource data associated with a manageable resource according to some embodiments. System 1000 specifically illustrates such storage and retrieval with respect to soft sensor data. Soft sensor data may comprise sensor data associated with a manageable software resource of a managed host.

System 1000 includes manageable software resource 1010, associated hardware device 1020, host memory 1030, core 1040 and system management module 1050. The elements of system 1000 may instantiate any similarly-named elements described herein. The method illustrated by system 1000 assumes that core 1040 has previously discovered RDRs associated with managed resource data of manageable software resource 1010.

Figure 12A:
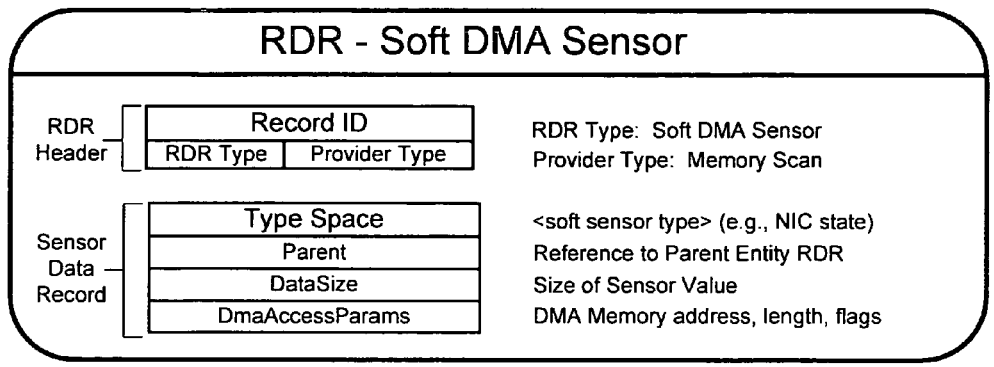
FIGS. 12a and 12b illustrate Resource Data Record formats according to some embodiments.
Figure 12B:
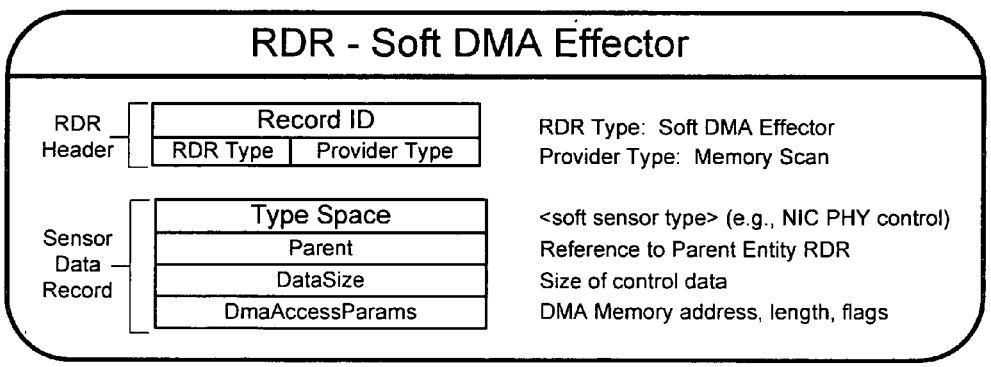

The previously-discovered RDRs may be associated with managed soft resource data, including soft effectors and soft sensors. FIGS. 12a and 12b illustrate RDRs used by core 1040 to interact with managed soft resource data. The soft DMA sensor RDR of FIG. 12a specifies a soft sensor type and information required to access the soft sensor. Such a sensor may indicate operational or health data of its associated manageable software resource. The soft DMA effector RDR of FIG. 12b describes an effector that may be used to control operation of the managed host (e.g. a NIC's auto-negotiation feature). The effector RDR also includes information for direct memory access of the associated effector.

In one example of operation, resource 1010 of system 1000 writes changes to soft sensor data to locations of host memory 1030 that are associated with the soft sensor data. These locations are specified by RDRs associated with the soft sensor data as described above. In the meantime, system management module 1050, which may comprise diagnostic code written specifically for resource 1010, may issue a request to read a sensor associated with resource 1010. Core 1040 checks an RDR associated with the sensor to determine that the sensor being read is instrumented for core 1040 and, if so, forwards the request to a memory scan provider (not shown) of the management platform. The provider reads the sensor by accessing a memory location specified by the associated RDR. The sensor data is returned to system management module 1050 via a callback or other mechanism.

Although the sensor data is illustrated as being stored in host memory 1030, some embodiments provide storage of the sensor data in alternative or additional memory locations. For example, the sensor data may be stored in and accessed from kernel non-paged memory set up by resource 1010 to store its code and/or data. The sensor data may be stored in and accessed from data buffers set up by resource 1010 but owned by device 1020.

Figure 13:
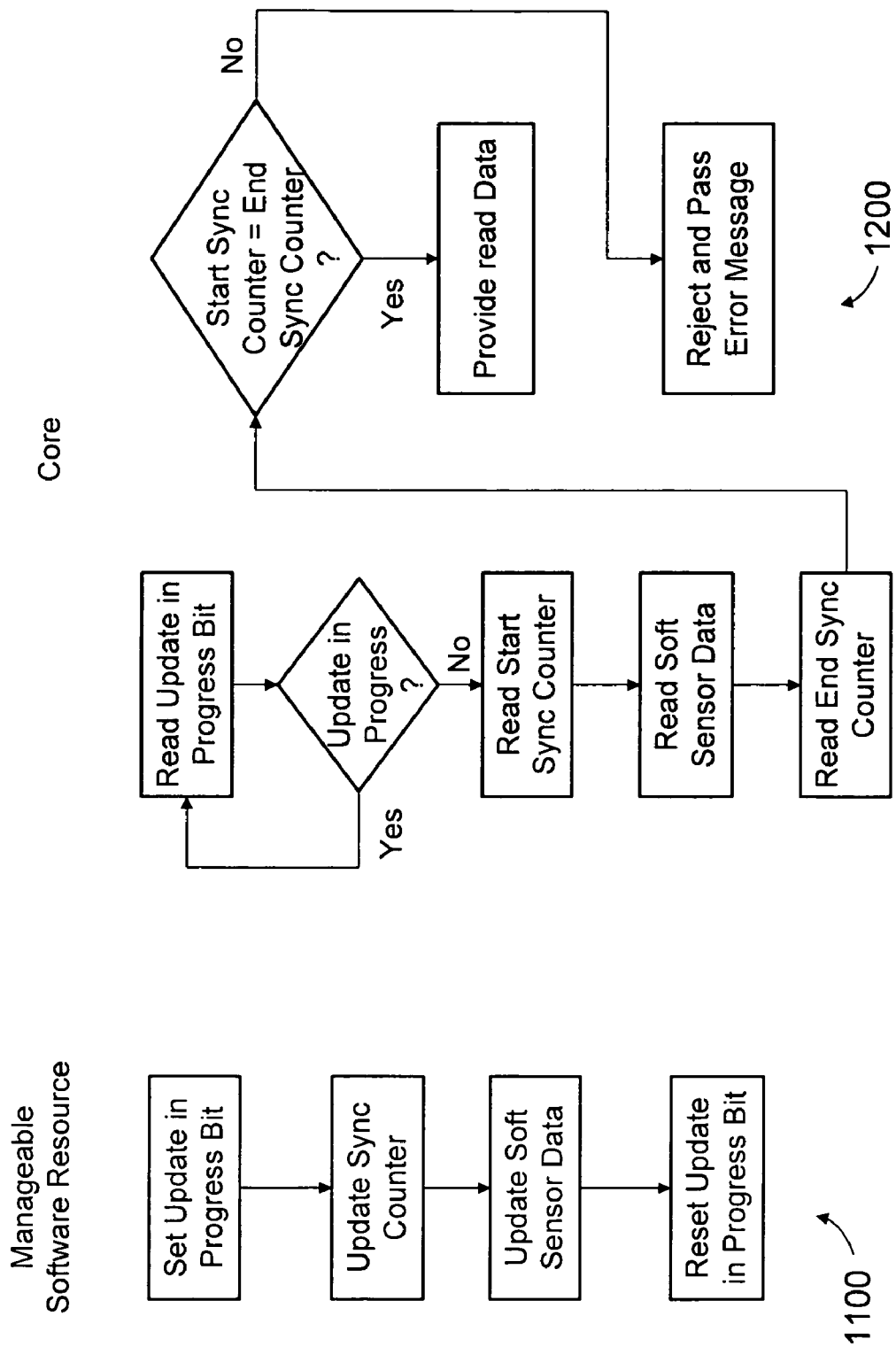
FIG. 13 comprises flow diagrams to update and to read soft sensor data according to some embodiments.

FIG. 13 illustrates method 1100 and method 1200 to update soft sensor data and to read soft sensor data, respectively, according to some embodiments. Method 1100 may be executed by a manageable software resource such as resource 1010. In some embodiments, method 1200 is executed by core 1040 in conjunction with a memory scan provider and in response to a request for sensor data received from a system management module.

Turning first to method 1100, a manageable software resource initially sets an "update in progress" bit to indicate that an update to associated soft sensor data is in progress. The bit may be located in any memory location accessible to the managed host and to a management platform. Next, the manageable software resource updates a sync counter that is also associated with the particular soft sensor data to be updated and is located in a memory location accessible to the managed host and to the management platform. The soft sensor data is then updated and the update in progress bit is reset to indicate that no update is in progress.

Method 1200 commences with reading of the update in progress bit. If the bit indicates that an update to the desired soft sensor data is in progress, the bit is read periodically until the bit indicates that no update is in progress. The core then reads the sync counter, stores the read value as a Start Sync value, reads the soft sensor data using the memory scan provider, reads the sync counter, and stores the read value as an End Sync value. If the Start Sync value is not equal to the End Sync value, the read soft sensor data is rejected and an error message is passed to the requesting system management module. If the two values are equal, the read data is provided to the system management module. Some embodiments also provide integrity checking of the read sensor data by associating an integrity check value into the stored sensor data during method 1100 and by evaluating the value during method 1200.

Figure 14:
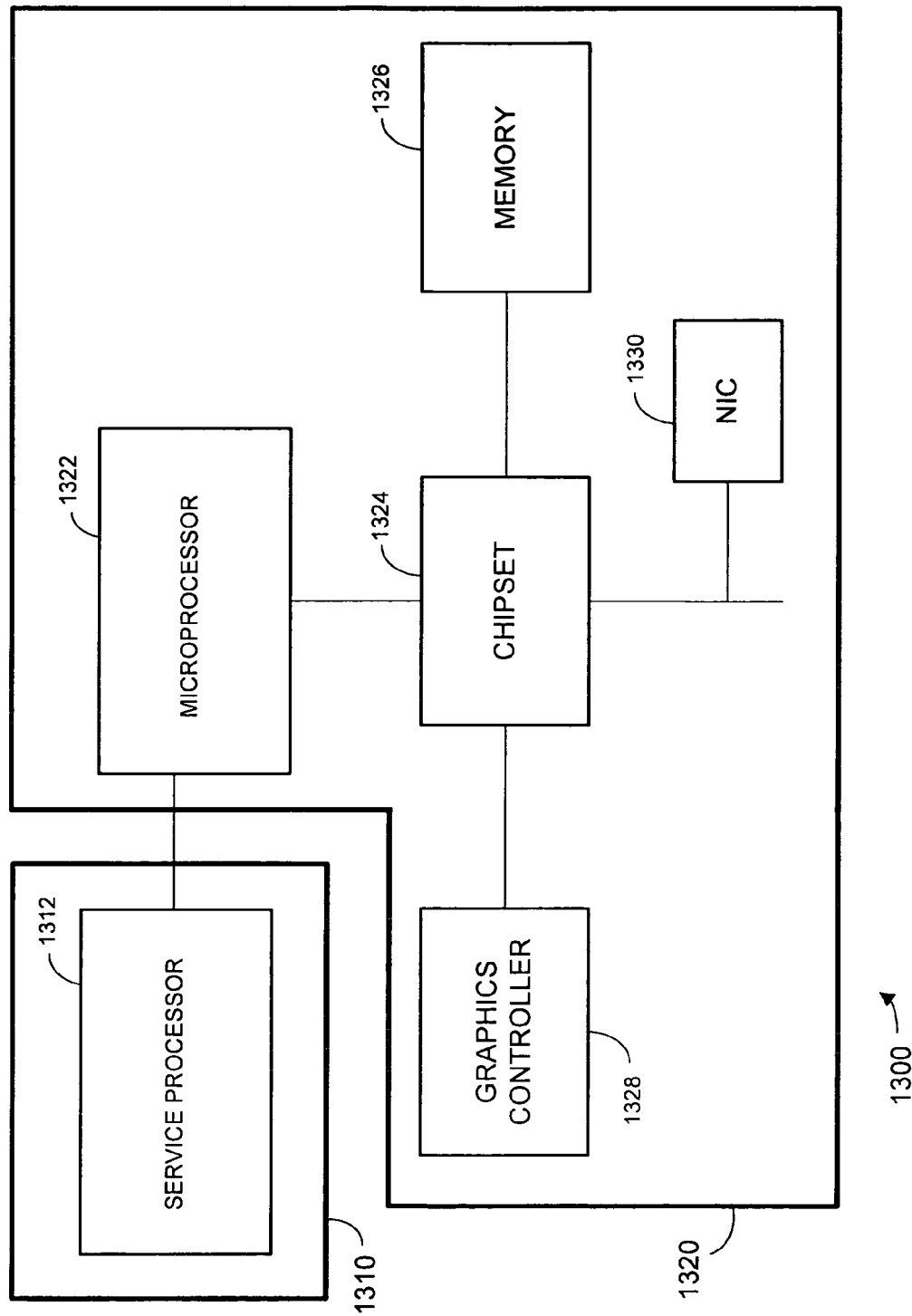
FIG. 14 is a block diagram of a system according to some embodiments.

FIG. 14 illustrates a block diagram of system 1300 according to some embodiments. System 1300 includes management platform 1310 and managed host 1320. Management platform 1310 includes service processor 1312 which may execute functions attributed to a management platform herein. In some embodiments, service processor 1312 executes a system management module as described above. Managed host 1320 comprises microprocessor 1322, which may execute the host software described herein (e.g., manageable software resources, host management driver, etc.). Managed host 1320 also includes chipset 1324 and host memory 1326. Host memory 1326 may comprise any suitable type of memory, including but not limited to Single Data Rate Random Access Memory and Double Data Rate Random Access Memory. Other functional units of managed host 1320 include graphics controller 1328 and Network Interface Controller (NIC) 1330, each of which may communicate with microprocessor 1322 via chipset 1324.

The several embodiments described herein are solely for the purpose of illustration. Therefore, persons in the art will recognize from this description that other embodiments may be practiced with various modifications and alterations.

What is claimed is:

1. A medium storing processor-executable program code executed by a processor, the code comprising:
   code to provide a resource service module, the resource service module to expose an interface, to receive an invocation of the interface from a system management module, to request managed resource data associated with a manageable resource based on the invocation, to instruct the provider module to retrieve the resource data record from a memory location, and to store the resource data record in a resource data record repository;

code of a the resource data record repository; the resource data record repository comprising a resource data record indicating the memory location of a managed host in which the managed resource data is stored; and code to provide a provider module, the provider module to receive the request and to retrieve the managed resource data from the memory location of the managed host, to receive an indication of the manageable resource and an indication of a memory location of the managed host in which the resource data record is stored, and to scan the memory of the managed host for a marker associated with resource data records of the managed host, wherein the marker comprises the indication of the manageable resource and the indication of the memory location of the managed host in which the resource data record is stored.

2. A medium according to claim 1, wherein the manageable resource is physically coupled to a bus.

3. A medium according to claim 1, wherein the indication of a memory location of a managed host in which the managed resource data is stored also identifies a type of provider needed to access the managed resource data.

4. A medium according to claim 1, the program code further comprising:

code to provide a proxy driver, the proxy driver to be executed by the managed host and to communicate with a managed software entity of the managed host and with the provider module.

5. A medium according to claim 4, the proxy driver to further communicate with a second managed software entity of the managed host.

6. A medium according to claim 1, the program code further comprising:

code to provide a first buffer for messages from the provider module to the managed host; and code to provide a second buffer for messages from the managed host to the provider module, wherein the provider module is to retrieve the managed resource data from the memory location of the managed host by storing a first message requesting the managed resource data in the first buffer and to retrieve a second message including the managed resource data from the second buffer.

7. A medium according to claim 1, the program code further comprising:

code to provide the manageable resource, the manageable resource to update the managed resource data in the memory location of the host memory by setting an update bit, incrementing a counter, updating the managed resource data, and resetting the update bit, and wherein the provider module is to retrieve the managed resource data from the memory location of the managed host by determining that the update bit is not set, reading a first value from the counter, reading the managed resource data, reading a second value from the counter, and determining that the first value is equal to the second value.

8. A medium according to claim 1, wherein the resource data record indicates a provider type associated with the managed resource data, and wherein the provider module is associated with the provider type.

9. A method comprising:

receiving a request from a system management module via an external interface for managed resource data associated with a manageable resource;

identifying a resource data record indicating a memory location of a managed host in which the managed resource data is stored;

retrieving the managed resource data from the memory location of the managed host;

receiving an indication of the manageable resource and an indication of a memory location of the managed host in which the resource data record is stored;

retrieving the resource data record from the memory location;

storing the resource data record in the resource data record repository; and scanning memory of the managed host for a marker associated with resource data records of the managed host, wherein the marker comprises the indication of the manageable resource and the indication of the memory location of the managed host in which the resource data record is stored.

10. A method according to claim 9, further comprising:

transmitting the managed resource data to the system management module via the external interface.

11. A method according to claim 9, wherein the manageable resource is physically coupled to a bus.

12. A method according to claim 9, further comprising:

wherein indicating a memory location of a managed host in which the managed resource data is stored also identifies a type of provider needed to access the managed resource data.

13. A method according to claim 9, wherein retrieving the managed resource data from the memory location of the managed host comprises:

storing a first message requesting the managed resource data in a first buffer for messages to the managed host; and retrieving a second message including the managed resource data from a second buffer for messages from the managed host.

14. A method according to claim 9, wherein retrieving the managed resource data from the memory location of the managed host comprises:

determining that the update bit is not set;

reading a first value from the counter;

reading the managed resource data;

reading a second value from the counter; and determining that the first value is equal to the second value.

15. A method according to claim 9, further comprising:

determining a provider to retrieve the managed data resource based on the resource data record; and using the provider to retrieve the managed resource data.

16. An apparatus comprising:

a memory storing executable program code; and an execution unit operable in conjunction with the program code to:

receive a request from a system management module via an external interface for managed resource data associated with a manageable resource;

identify a resource data record indicating a memory location of a managed host in which the managed resource data is stored;

scan memory of the managed host for a marker associated with resource data records of the managed host, wherein the marker comprises an indication of the manageable resource and an indication of the memory location of the managed host in which the resource data record is stored; and retrieve the managed resource data from the memory location of the managed host, wherein the manageable resource is physically coupled to a bus.

17. An apparatus according to claim 16, the execution unit further operable in conjunction with the program code to:
    transmit the managed resource data to the system management module via the external interface.

18. An apparatus according to claim 16, the execution unit further operable in conjunction with the program code to:
    receive an indication of the manageable resource and an indication of a memory location of the managed host in which the resource data record is stored;
    retrieve the resource data record from the memory location; and
    store the resource data record in the resource data record repository.

19. An apparatus according to claim 18, wherein the indication of a memory location of a managed host in which the managed resource data is stored also identifies a type of provider needed to access the managed resource data.

20. An apparatus according to claim 16, wherein retrieval of the managed resource data from the memory location of the managed host comprises:
    storage of a first message requesting the managed resource data in a first buffer for messages to the managed host; and
    retrieval of a second message including the managed resource data from a second buffer for messages from the managed host.

21. An apparatus according to claim 16, wherein retrieval of the managed resource data from the memory location of the managed host comprises:
    determination that the update bit is not set;
    reading of a first value from the counter;
    reading of the managed resource data;
    reading of a second value from the counter; and
    determination that the first value is equal to the second value.

22. An apparatus according to claim 16, the execution unit further operable in conjunction with the program code to:
    determine a provider to retrieve the managed data resource based on the resource data record; and
    use of the provider to retrieve the managed resource data.

23. A system comprising:
    a processor;
    a double data rate memory coupled to the processor;
    a memory storing executable program code; and
    a service processor operable in conjunction with the program code to:
        receive a request from a system management module via an external interface for managed resource data associated with a manageable resource executed by the processor;
        identify a resource data record indicating a memory location of a managed host in which the managed resource data is stored;
        scan the double data rate memory for a marker associated with resource data records of the managed host, wherein the marker comprises an indication of the manageable resource and an indication of the memory location of the managed host in which the resource data record is stored; and
        retrieve the managed resource data from the memory location of the managed host, wherein the manageable resource is physically coupled to a bus.

24. A system according to claim 23, the service processor further operable in conjunction with the program code to:
    receive an indication of the manageable resource and an indication of a memory location of the managed host in which the resource data record is stored;
    retrieve the resource data record from the memory location; and
    store the resource data record in the resource data record repository.

25. A system according to claim 24, wherein the indication of a memory location of a managed host in which the managed resource data is stored also identifies a type of provider needed to access the managed resource data.

26. A system according to claim 23, the service processor further operable in conjunction with the program code to:
    determine a provider to retrieve the managed data resource based on the resource data record; and
    use of the provider to retrieve the managed resource data.

* * * * *